Nov. 12, 1963    W. GESCHE    3,110,188
INFINITELY VARIABLE CONE PULLEY GEAR
Filed Jan. 12, 1962    2 Sheets-Sheet 2

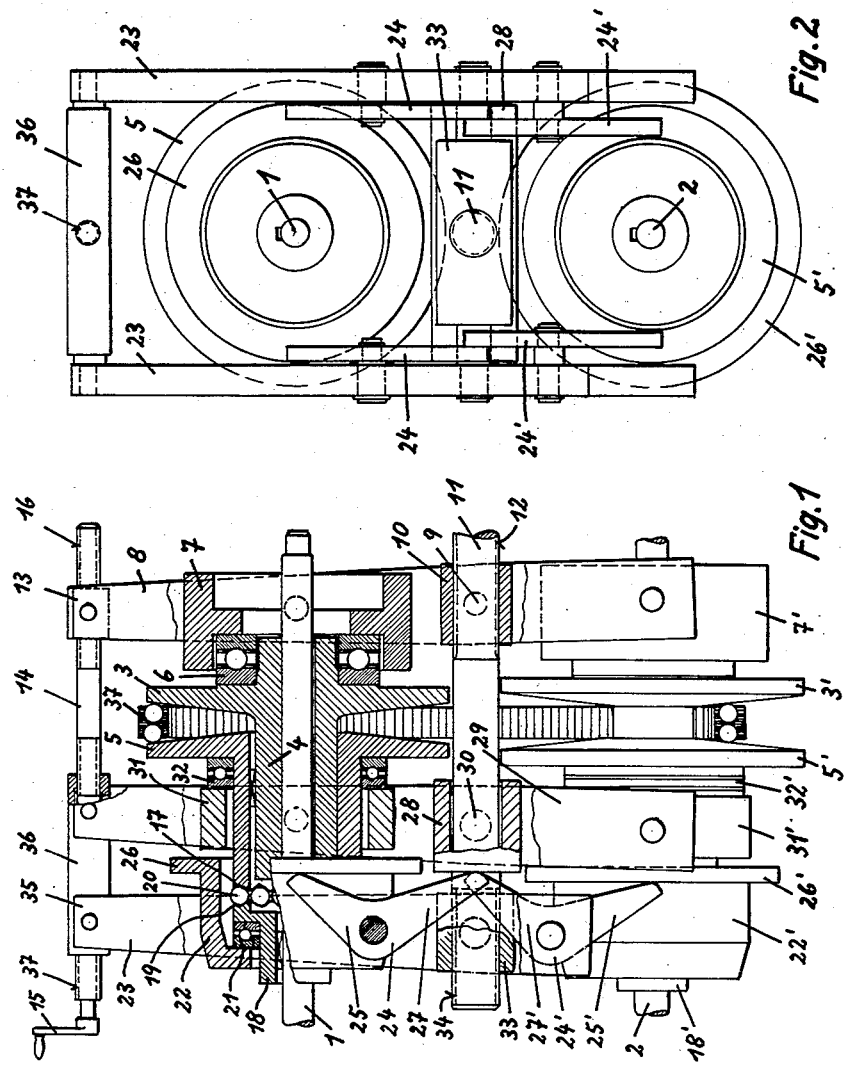

INVENTOR.
Werner Gesche
BY
Bailey, Stephens & Huettig
Attorneys

United States Patent Office 3,110,188
Patented Nov. 12, 1963

3,110,188
INFINITELY VARIABLE CONE PULLEY GEAR
Werner Gesche, Bad Homburg vor der Hohe, Germany, assignor to Reimers-Getriebe K.G., Ascona, Switzerland, a firm of Switzerland
Filed Jan. 12, 1962, Ser. No. 165,769
Claims priority, application Germany Jan. 16, 1961
6 Claims. (Cl. 74—230.17)

The present invention relates to an infinitely variable gear of the type which comprises two pairs of conical pulley disks and a driving belt connecting the same, and in which the contact pressures which are required on the driving and driven shafts of the gear for transmitting the frictional forces from the conical disks to the belt or chain or vice versa are produced by pressure applying means which are adapted to exert axial forces upon the respective pair of conical disks and are of a size in proportion to the torque which acts upon the respective shaft, and in which the forces which are effective in the pressure applying means are at the same time transmitted as additional axial forces to the other pair of conical disks.

The pressure applying means on the two gear shafts of the conventional gears of the above-mentioned type consist of V-shaped recesses in the end surfaces of the conical disks and in the associated pressure applying rings opposite thereto. While the conical disks of these gears are rotatably mounted on the shafts, the pressure applying rings (hereafter simply called "pressure rings") are nonrotatably connected thereto, and the conical disks as well as the pressure rings are slidable in the axial direction relative to the associated shafts. The opposite V-shaped recesses contain balls for transmitting the torque from the respective shaft through the pressure rings to the associated conical disk or vice versa. These balls engage against the diagonally opposite inclined surfaces of the V-shaped recesses in the respective pressure ring and the associated hub of the conical disk, whereby the tangential force acting on the balls is transformed into an axial force which is proportional to the torque and presses the conical disks against the driving belt or chain. The constant of proportionality between the torque and the axial force which has been generated is also dependent upon the degree of inclination of these inclined surfaces.

Aside from the axial forces which act upon the conical disks, there also are reaction forces produced of the same size which act upon the pressure rings in the opposite direction. In the conventional gears of this type, these reaction forces are transmitted by means of two-armed levers to the respective other pair of conical disks in addition to the axial forces which are exerted thereon. Thus, in these conventional gears, each pair of conical disks is acted upon by axial forces which are proportional to the sum of the torques which act upon both shafts. A contact pressure of this size is, however, also approximately proportional to the traction in the driving belt at any gear ratio, as may be proved by a simple calculation. By extensive experiments and measurement it has, however, now been found that the "correct" contact pressure should not be proportional to the sum of the torques acting upon both shafts. This "correct" contact pressure is that force which is just strong enough to prevent the belt or chain from slipping between the two pairs of conical disks so that any excessive contact pressure and the power for producing it, as well as the wear upon the gear resulting from it will be avoided.

It is therefore the object of the present invention to provide a gear of the above-mentioned type in which the contact pressure is made so strong that any slipping of the belt or chain will be absolutely prevented, but in which this pressure will not reach such as size that it will reduce the working life of the gear.

Due to the strong increase of the torque on the driven shaft when it is geared down to a lower speed, an excessive contact pressure occurs in almost the entire transmission range. This excessive pressure exerts an undue load upon the thrust ball bearings between the rotating conical disks and the pressure rings and also between these bearings and the control and power-transmitting levers which are pivotably mounted in the gear housing. This load may be so great that, if the specific load of the gear is increased and the gear is made of larger dimensions it is extremely difficult to provide such thrust bearings which will continue to stand up for a longtime. The excessive contact pressure also increases the wear upon all other parts of the gear which are affected by it and it therefore reduces the working life of the entire gear.

According to the invention it has been found that such excessive contact pressures may be prevented by increasing the effect of the driving torque upon the total generated contact pressure and by reducing the effect of the driven torque which is strongly influenced by the gear ratio.

The object of the invention is attained in gears of the mentioned type by providing the gear elements which determine the constants of proportionality between the torque and the axial force in such an arrangement and of such dimensions that the two pairs of conical disks are acted upon by axial forces which form a sum in accordance with the formula $aM_1 + bM_2$, in which $a$ and $b$ indicate constants of proportionality differing from each other $$\left(\text{unit of measure } \frac{kp}{mkp}\right)$$

and $M_1$ and $M_2$ indicate the torques (unit of measure $mkp$) on the two gear shafts, while the index 1 indicates the driving shaft and the index 2 the driven shaft. In the conventional gears of the mentioned type these axial forces had a size which corresponded to a sum in accordance with the formula $c(M_1 + M_2)$.

The formation of an axial force sum according to the formula $aM_1 + bM_2$ by providing the gear elements which determine the constants of proportionality $a$ and $b$ of suitable dimensions and in a suitable arrangement may be carried out according to the invention in different manners. Thus, for example, it is possible to transmit the forces which are effective in each of the two pressure applying means to the respective other pair of conical disks by means of transmitting levers with arms of different lengths. Another manner of accomplishing this consists in making the angle of inclination of the inclined surfaces of the pressure applying means on each shaft of a size different from those on the other shaft and/or by making the distance between the inclined surfaces and the axis of rotation of each shaft different from that on the other shaft. These features when applied either individually or in any suitable combination with each other necessarily require the gear to be of an unsymmetrical construction which means that, at any desired direction of rotation, one of the gear shafts must always serve as the drive shaft and the other gear shaft as the driven shaft. This fact, however, hardly impairs the usefulness of such a gear since the driving and driven shafts are in most cases not interchangeable because of the position of the driving motor or the connection of an additional gear transmission either in front of the drive shaft or behind the driven shaft. If, however, the direction of rotation of the gear is fixed and the effective direction of the torque changes, as it occurs, for example, in vehicle gears when driving uphill or downhill, it is possible to transmit axial forces to the two pairs of conical disks in proportion to the formula $aM_1+bM_2$ by making the two inclined surfaces of each V-shaped recess in the mentioned pressure rings of different angles, for example, in such a manner that, even though the effective direction of the torque might change, the tangential forces at the driving side of the gear will always be effective on inclined surfaces of a smaller angle of inclination, while the tangential forces at the driven side will be effective on inclined surfaces of a steper angle.

A preferred embodiment of the invention consists in transmitting the reaction forces which are produced by the two pressure-applying units by means of angular levers to an intermediate lever from which the sum of these reaction forces is then distributed as additional axial forces upon both pairs of conical disks. If this embodiment is applied, superimposed axial forces according to the formula $aM_1+bM_2$ will likewise be attained on each of the two pairs of conical disks if either the intermediate levers or the angular levers are provided with arms of different lengths. The last-mentioned embodiment is particularly of advantage since the basic dimensions of the gear may then remain symmetrical, for example, in that the shafts may then be mounted at the same distance from the tension spindle which is usually mounted between them, while the necessary asymmetry of the gear is applied to secondary elements, that is, to the mentioned angular levers.

In such an embodiment of the invention it is also easily possible to apply additionally the features which were previously mentioned, namely, to make the angle of inclination of the inclined surfaces and the distance between them and the axis of rotation of the pressure applying units of both shafts of different sizes.

The objects, features, and advantages of the present invention will become more clearly apparent from the following detailed description thereof which is to be read with reference to the accompanying drawings, in which—

FIGURE 1 shows a diagrammatic plan view, partly in a horizontal section, of a gear according to the invention;

FIGURE 2 shows a side view of the gear according to FIGURE 1;

FIGURE 5 shows a diagrammatic illustration of parts of the pressure-exerting mechanism of the driven shaft with inclined surfaces of different angles; while

Figure 6:
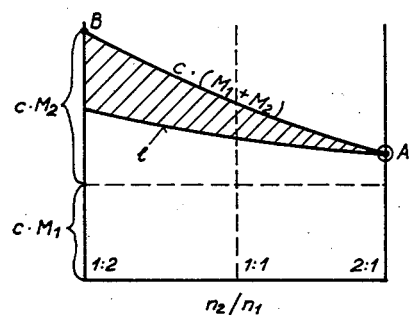
FIGURES 6 and 7 show two explanatory diagrams.

In the drawings, FIGURE 1 shows the gear according to the invention from which the housing has been removed for a better illustration. This gear essentially consists of two equal sets of conical pulley disks, the upper set of which is shown in section. These disks are mounted on two parallel shafts 1 and 2, shaft 1 forming the drive shaft and shaft 2 forming the driven shaft. Shaft 1 carries a conical disk 3 which is rotatable and axially slidable thereon and has a long hub 4 on which the second conical disk 5 of this set is mounted so as to be slidable in the axial direction but nonrotatable relative to disk 3. Disk 3 is supported in the axial direction by a thrust ball bearing 6 on a bracing ring 7 which is mounted between a pair of aligned control levers 8 which are pivotably mounted on pivot pins 9 on a tension block 10 which, in turn, is screwed on the threads 12 of a tension spindle 11 so that when spindle 11 is turned, tension block 10 and thus also the pivoting axis of control levers 8 are shifted in the axial direction along spindle 11. The free ends of control levers 8 underneath tension spindle 11, as shown in FIGURE 1, carry a bracing ring 7' similar to ring 7 for supporting the conical disk 3' of the second pair of conical pulley disks on shaft 2. Since this second pair of disks is of the identical shape as the pair of disks on shaft 1, the corresponding parts of both pairs are identified by the same reference numerals, except that a prime is added to each numeral referring to the parts of the second pair of disks. The other ends of the control levers 8 are connected to a threaded block 13 which is screwed on the thread 18 of a control spindle 14 and is slidable along the latter when the spindle is turned by means of a crank 15. Thus, when control spindle 14 is turned to change the transmission ratio of the gear, the conical disks 3 and 3' are shifted for equal distances in opposite directions to each other along their shafts 1 and 2.

Figure 3:
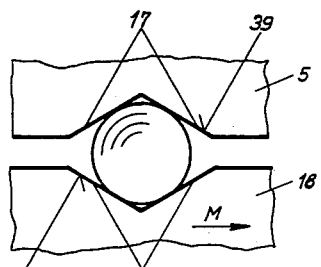
FIGURE 3 shows a diagrammatic illustration of a pressure-applying means.
Figure 4:
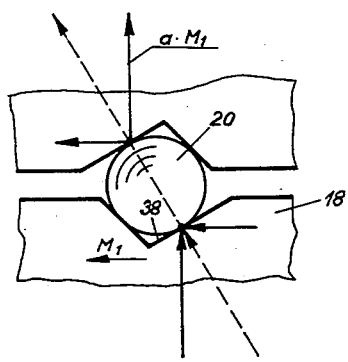
FIGURE 4 shows a diagrammatic illustration of parts of the pressure applying means of the drive shaft with inclined surfaces of different slopes.
Figure 5:
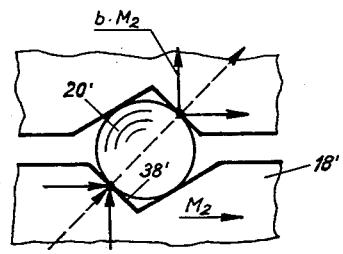

The end surfaces of the hubs of disks 5 and 5' are provided with a plurality of V-shaped recesses 17, as illustrated diagrammatically in FIGURE 3, which are spaced at equal peripheral distances from each other and are disposed directly opposite to similar recesses 19 in the end surfaces of pressure rings 18 and 18' (only partly shown in FIGURE 1) which are mounted on shafts 1 and 2, respectively, so as to be axially slidable thereon but nonrotatable relative thereto. Each opposite pair of these recesses 17 and 19 contains a pressure-transmitting ball 20. Pressure ring 18 is supported in the axial direction by a thrust ball bearing 21 on a bell-shaped supporting member 22, while the other pressure ring 18' on shaft 2 is supported in the same manner by a thrust ball bearing on a bell-shaped supporting member 22'.

At the side of the gear opposite to the control levers 8 another pair of aligned control levers 23 is provided, on the inner sides of which two pairs of angular levers 24 and 24' are pivotably mounted. One arm 25 or 25' of each of these levers engages upon the outer flange 26 or 26' of the bell-shaped members 22 or 22', respectively, while the other arms 27 and 27' act together upon a bearing block 28 which is slidably mounted on the tension spindle 11 and carries an intermediate pair of levers 29 which are pivotable on pivot pins 30. By intermediate rings 31 and 31' and thrust bearings 32 and 32', these intermediate levers 29 bear upon the second conical disks 5 and 5' of each set. The free outer ends of levers 29 are pivotably connected to a threaded sleeve 36 which is adjustable in the axial direction on a screw thread 37 which has a pitch reverse to that of thread 12.

The pair of control levers 23 is pivotably mounted in the same manner as the pair of control levers 8 on a tension block 33 which may be adjusted in the axial direction by a rotation of tension spindle 11 which has a screw thread 34 with a pitch reverse to that of tension spindle 12. On their free outer ends, control levers 23 are also pivotably connected to the threaded sleeve 36. When tension spindle 11 is turned, the two tension blocks 10 and 33 will be moved in opposite axial directions and may thus be adjusted so that, when the gear is not running under a load, belt 37 connecting the two pairs of conical disks 3, 5 and 3', 5' will have the proper tension. By turning the control spindle 14 by means of crank 15, it is possible to change the axial distance equally between the disks of each pair, that is, between disks 3 and 5 and disks 3' and 5', but in opposite directions to each other, and thus to effect any arbitrary change in the transmission ratio of the gear.

In the conventional gears of this type, the contact pressure which was exerted on both shafts and therefore amounted to $A_1=A_2=c(M_1+M_2)$. This is illustrated diagrammatically in FIGURE 6, in which $n$ indicates the speed of rotation of the shafts and $n_2/n_1$ therefore indicates the gear ratio. Above the gear ratio the contact pressure A is logarithmically plotted. Assuming that the torque of the drive shaft of the gear is constant in all gear ratios, the uppermost curve in FIGURE 6 complies with the law $c(M_1+M_2)$. The total amount of this pressure is composed of two components:

(1) A component $c.M_1$ which is constant, and
(2) A component $c.M_2$ which varies strongly as the gear ratio changes.

The "correct" course of the contact pressure, however, is indicated by the lower curve $l$. The hatched area in FIGURE 6 between the two curves indicates the size of the excessive contact pressure which occurred unnecessarily in the conventional gears of this type and reduced their useful life, and which is to be prevented according to the invention.

The manner of operation of the pressure applying means according to the invention is as follows:

Assuming that each shaft 1 and 2 of the gear is subjected to the load of a torque, these torques will be transmitted from these shafts through the pressure rings 18 and 18' to the balls 20 which are enclosed in the V-shaped recesses 19 in rings 18 and 18' and in the opposite recesses 17 in the end surfaces of the hubs of disks 5 and 5'. Thus, at first the torques acting upon shafts 1 and 2 are transmitted to disks 5 and 5' and also to disks 3 and 3' because of the nonrotary connection between these disks. At the same time, however, when the torque is directed as indicated by the arrow M in FIGURE 3, balls 20 have the tendency to run upwardly along the opposite inclined surfaces 38 and 39 of the V-shaped recesses 19 and 17.

The particular angle of the inclined surfaces 38 and 39 and the distance between them and the axis of rotation determine the constant of proportionality at which the torque acting upon each shaft is converted into an axial force which, on the one hand, acts upon the hub of the conical disk 5 or 5' and presses the same against belt 37 and the latter, in turn, against the other conical disk 3 or 3' which is held in a fixed position by the pair of control levers 8. On the other hand, a reaction force of the same magnitude acts upon pressure rings 18 or 18', but in the opposite direction. This reaction force is transmitted through the thrust bearings 21 and the bell-shaped members 22 and 22' to arms 25 and 25' of the two pairs of angular levers 24 and 24' which are pivotably mounted between the two control levers 23, and it is further transmitted by the other arms 27 and 27' of these levers to the bearing block 28 and thus to the pair of intermediate levers 29. Since these intermediate levers 29 engage through the ball bearings 32 and 32' against the conical disks 5 and 5', the sum of the reaction forces acting upon the bearing block 28 is distributed upon disk 5 and 5' in the form of additional axial contact pressures.

According to the invention, the axial pressures acting upon the two pairs of conical disks should amount to a sum in accordance with the formula $aM_1+bM_2$, in which the letters $a$ and $b$ indicate constants of proportionality which differ from each other, while $M_1$ and $M_2$ indicate the torques acting upon shafts 1 and 2. If the letter $c$ indicates the constant of proportionality between the torque M and the axial force which is produced on both shafts by the pressure-applying means, an axial force on shaft 1 of a value of $cM_1$ is then exerted directly upon disk 5 in a similar manner as in the conventional gear construction, and an axial force on shaft 2 of a value of $cM_2$ is exerted directly upon the disk 5', provided the inclined surfaces 17 and 19 of both pressure-exerting mechanisms on the driving and driven shafts are equally inclined and that the distances between these inclined surfaces and the respective axes of rotation are also the same.

Due to the reaction forces $c.M_1$ and $c.M_2$, the angular levers 24 and 24' then exert a force upon the bearing block 28 which is proportional to the value $c.(M_1+M_2)$ if the arms of these levers are all of the same length, and which force is proportional to the value $c.(e/f.M_1+f/e.M_2)$ if both levers are alike but the arms of each lever are of different lengths, as indicated in this formula by the letters $e$ and $f$. Thus, an additional force acts upon disks 5 and 5' in which the components $M_1$ and $M_2$ have different magnitudes in accordance with the difference in the lengths of the arms of levers 24 and 24' and by means of which the sums of these axial forces, that is, the contact pressures, may again be expressed in accordance with the object of the invention by the formula $a.M_1+b.M_2$. The same applies if the inclined surfaces 17 and 19 of the pressure applying means on shafts 1 and 2 are inclined at different angles relative to each other or if these inclined surfaces are spaced at different distances from the respective axes of rotation, or also if the bearing block 28 is mounted toward one side of the center between the ball bearings 32 and 32'. Of course, it is also possible to combine several of these features in a suitable manner with each other in order to attain the most favorable numerial values for $a$ and $b$ which determine the total axial force, that is, the entire contact pressure which acts upon each set of conical disks.

Figure 7:
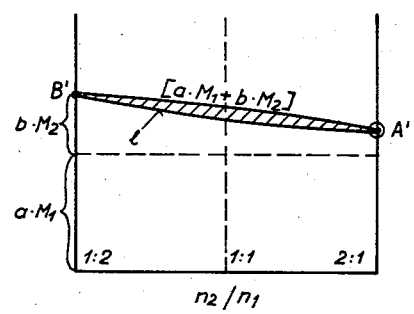

The result of such a feature is diagrammatically indicated in FIGURE 7 which shows that, if the contact pressure is exerted in accordance with the formula $aM_1+bM_2$ in which $a$ and $b$ are constants of proportionality of different sizes, the size of the contact pressure may be determined in accordance with two characteristic points A' and B', and that as compared with the "ideal" curve $l$, only very small excessive contact pressures will remain. FIGURE 7 also applies to a constant driving torque in all gear ratios.

In this manner it is possible to determine and preset the actually prevailing contact pressure on each set of disks and at each gear ratio at the respective shaft so as to approximate very closely the required amount of contact pressure so that belt 37 will under no circumstances slip between the two pairs of conical pulley disks and also any unnecessary contact pressures will be avoided at the various transmission ratios of the gear which would result in an excessive wear upon the entire gear as well as in an undue load upon the thrust bearings 6, 21, and 32.

Although my invention has been illustrated and described with reference to the preferred embodiments thereof, I wish to have it undestood that it is in no way limited to the details of such embodiments, but is capable of numerous modifications within the scope of the appended claims.

Having thus fully disclosed my invention, what I claim is:

1. In an infinitely variable transmission having a drive shaft and a driven shaft, a pair of conical disks on each of said shafts, flexible driving means connecting said pairs of disks, two pressure applying means each operatively connected with one of the disks for exerting axial forces upon said disks for producing the contact pressures required for transmitting frictional forces from said disks to said driivng means and vice versa, said axial forces being proportional to the torque acting upon the respective shaft, further means connected between said pressure applying means for also transmitting the reaction forces effective in said pressure applying means associated with one pair of said disks as additional axial forces to the other pair of disks, said pressure applying and said force transmitting means including means to produce axial forces upon the two pairs of conical disks forming a sum in accordance with the formula $aM_1+bM_2$, in which $a$ and $b$ denote constants of proportionality differing from each other, while $M_1$ and $M_2$ denote the torques acting upon the two gear shafts.

2. An infinitely variable transmission as defined in claim 1, in which said means for transmitting the reaction forces from the pressure applying means associated with one pair of conical disks additionally to the other pair of disks comprise levers having arms of different lengths.

3. An infinitely variable transmission as defined in claim 1, in which said pressure applying means have substantially V-shaped recesses each forming a pair of inclined surfaces, said surfaces associated with said drive shaft having a different angle of inclination from said surfaces associated with said driven shaft.

4. An infinitely variable transmission as defined in claim 1, in which said pressure applying means associated with each of said shafts have substantially V-shaped recesses each forming a pair of inclined surfaces, said surfaces associated with one of said shafts being spaced from the axis of rotation thereof at a distance different from the distance between said surfaces associated with the other shaft and the axis of rotation thereof.

5. An infinitely variable transmission as defined in claim 1, which said pressure applying means associated with each of said shafts have substantially V-shaped recesses each forming a pair of inclined surfaces, the two inclined surfaces of each pair having different angles of inclination.

6. An infinitely variable transmission as defined in claim 1, in which said means for transmitting the reaction forces from the pressure applying means associated with one pair of conical disks to the other pair of disks comprise angular levers and intermediate levers, at least one kind of said levers having arms of different lengths, said angular levers being adapted to transmit said reaction forces to said intermediate levers which distribute the sum of these forces as additional forces upon the two pairs of conical disks.

References Cited in the file of this patent

UNITED STATES PATENTS

| | | |
|---|---|---|
| 2,852,952 | Wolfram | Sept. 23, 1958 |
| 2,909,072 | Karig | Oct. 20, 1959 |